United States Patent [19]
Hinkley et al.

[11] Patent Number: 5,798,495
[45] Date of Patent: Aug. 25, 1998

[54] CONDUCTIVE JOINT FORMED BY ELECTRON BEAM WELDING AND METHOD THEREOF

[75] Inventors: Douglas A. Hinkley, Lincoln; James V. Fixemer, Denton; John J. Barta, Lincoln, all of Nebr.

[73] Assignee: Square D Company, Palatine, Ill.

[21] Appl. No.: 741,091

[22] Filed: Oct. 30, 1996

[51] Int. Cl.⁶ ............................................. B23K 15/00
[52] U.S. Cl. ............................................. 219/121.14
[58] Field of Search ................... 219/121.13, 121.14, 219/121.21, 121.29, 121.35; 148/524, 525; 29/868, 869; 228/246, 250

[56] References Cited

U.S. PATENT DOCUMENTS

| | | |
|---|---|---|
| 3,534,386 | 10/1970 | Mercer . |
| 3,534,387 | 10/1970 | Sanderson et al. . |
| 3,586,812 | 6/1971 | Fisher ........................ 219/121.21 X |
| 3,626,142 | 12/1971 | King .......................... 219/121.21 |
| 3,705,971 | 12/1972 | Jacovides et al. .......... 219/121.14 |
| 4,029,377 | 6/1977 | Guglielmi .................. 439/510 |
| 4,181,396 | 1/1980 | Olashaw . |
| 4,665,294 | 5/1987 | Hira et al. ................. 219/121.64 |
| 4,675,473 | 6/1987 | Illakowicz ................. 174/68.1 |
| 4,790,780 | 12/1988 | Bushfield .................. 439/887 |
| 4,811,887 | 3/1989 | King et al. . |
| 5,093,988 | 3/1992 | Becker ..................... 219/121.14 X |
| 5,151,571 | 9/1992 | Sanderson et al. ........ 219/121.13 |
| 5,268,555 | 12/1993 | Jones et al. .............. 219/121.63 |
| 5,276,298 | 1/1994 | Jones et al. .............. 219/121.63 |
| 5,317,471 | 5/1994 | Izoard et al. ............. 361/105 |
| 5,517,059 | 5/1996 | Eytcheson et al. ....... 219/121.13 X |

FOREIGN PATENT DOCUMENTS

| | | | |
|---|---|---|---|
| 57-36080 | 2/1982 | Japan ..................... 219/121.14 |
| 2-148669 | 6/1990 | Japan ..................... 219/121.14 |
| 4-37484 | 2/1992 | Japan . | |
| 4-75789 | 3/1992 | Japan ..................... 219/121.14 |
| 4-210879 | 7/1992 | Japan ..................... 219/121.14 |
| 1812031 | 4/1993 | U.S.S.R. ................. 219/121.14 |

*Primary Examiner*—Teresa J. Walberg
*Assistant Examiner*—Gregory L. Mills
*Attorney, Agent, or Firm*—Larry I. Golden; Kareem M. Irfan; Wayne H. Stoppelmoor

[57] ABSTRACT

An arrangement is provided for welding together current carrying members of an electrical distribution device which are made of similar conductive material. The arrangement includes an electron beam gun capable of generating an electron beam sufficient to penetrate and heat the material, thereby providing mixing of the material to form a joint which is constructed substantially of a portion of each of the current carrying members.

19 Claims, 2 Drawing Sheets

CONDUCTIVE JOINT FORMED BY ELECTRON BEAM WELDING AND METHOD THEREOF

FIELD OF THE INVENTION

The invention relates generally to joining conductive materials together in electrical distribution equipment such as busway and, more particularly, to a arrangement for electron beam welding similar electrically conductive material to form a highly conductive joint. In addition, the invention also relates to a method for electron beam welding together similar conductive material.

BACKGROUND OF THE INVENTION

The present method for joining similar conductive material components, such as busbars, in electrical busway is by gas-metal arc welding (GMAW). This method of joining the components together causes excess weld metal to form on the busbars which requires additional process time and cost for the removal thereof. Additionally, the GMAW method requires the use of a filler wire which has a lower conductivity than the busbar material, thereby creating a joint that is lower in conductivity than the busbars that are being welded together. This lower conductivity causes the resistivity of the joint to be higher than the original material and, hence, increases the heat rise in the joint when current is drawn therethrough.

Accordingly, there is a distinct need for an improved arrangement and method to join similar conductive material which will provide a joint that is substantially as conductive as the original material. Additionally, the improved arrangement will not produce excess weld metal on the material, thereby eliminating the need to remove this excess weld metal and, hence, decreasing the process time and cost required to weld the material together.

SUMMARY OF THE INVENTION

The present invention provides an improved method to join similar conductive components in electrical distribution equipment which provides decreased process cycle time and increased conductivity in the joint.

In accordance with a preferred embodiment of the present invention an arrangement is provided for welding together current carrying members of an electrical distribution device. The current carrying members are constructed from similar conductive material. The arrangement includes an electron beam gun capable of generating an electron beam sufficient to penetrate and heat the material, thereby providing mixing of the material to form a joint which is constructed substantially of a portion of each of the current carrying members.

Also according to this invention, current carrying components in an electrical distribution device are welded together using a process which includes the steps of disposing busbar components adjacent one another, activating an electron beam welding gun to generate an electron beam and passing the electron beam past the busbar components to form a joint.

BRIEF DESCRIPTION OF THE DRAWINGS

Other objects and advantages of the invention will be apparent from the following detailed description and the accompanying drawings in which.

Figure 1:
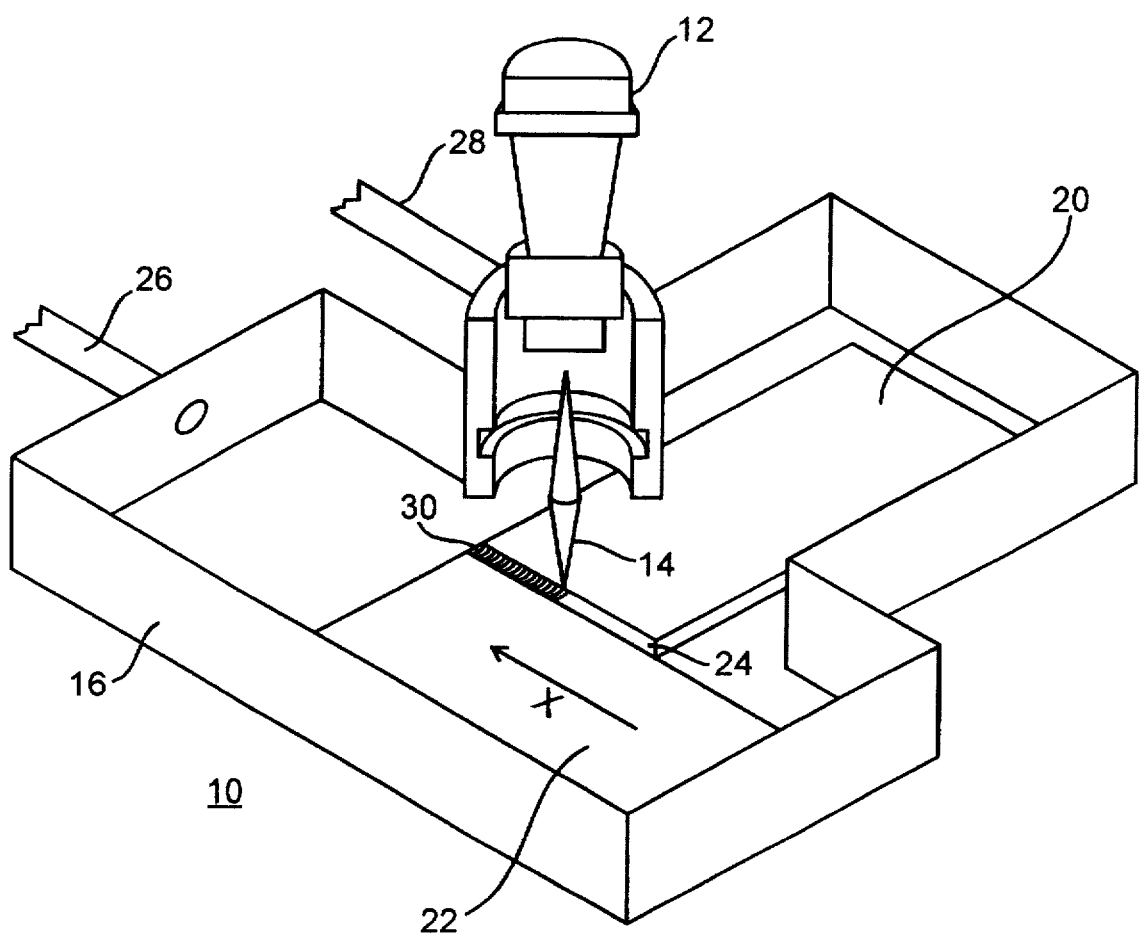
FIG. 1 is an isometric drawing of an electron beam welding arrangement for joining similar conductive material together according to the present invention.

While the invention is susceptible to various modifications and alternative forms, a specific embodiment thereof has been shown by way of example in the drawing and will be described in detail. It should be understood, however, that it is not intended to limit the invention to the particular form described, but on the contrary, the invention is to cover all modifications, equivalents, and alternatives falling within the spirit and scope of the invention as defined by the appended claims.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

FIG. 1 shows a preferred embodiment of an arrangement, designated generally by the reference character 10, in accordance with the present invention for joining current-carrying members in an electrical distribution device, such as the type shown in U.S. Pat. No. 4,673,229 entitled "Electrical Distribution System with an Improved Housing" which is assigned to the same assignee as the present application and the disclosure therein is incorporated herein by reference in its entirety. Current-carrying members, such as busbars, in electrical distribution devices of this type are typically joined together by traditional metal arc welding processes which cause excess weld material to form on the busbars. Additional process time is required to remove this excess weld material, thereby increasing the cost of the process. Additionally, traditional metal arc welding processes require the use of filler wire to assist in welding the busbars together. This filler wire has a lower conductivity than the busbars, thereby creating a joint that has a lower conductivity than the busbars. These problems are addressed by the arrangement 10 which includes an electron beam gun 12, which is capable of generating an electron beam 14, and a vacuum chamber 16. The gun is preferably implemented with a 12 kW at 60 kV electron beam gun available from Wentgate Dynaweld Inc. of Agawam, Mass. The chamber 16 includes vacuum hoses 26 and 28 secured thereto and a cover (not shown) for sealing the chamber 16 so that a vacuum may be created in the chamber 16. The gun 12 is secured to the cover (not shown) or the chamber 16 by means of an appropriate securing arrangement (not shown) which allows the gun 12 to move without a significant loss of vacuum in the chamber 16. For example, a motor could move the gun 12 on a slider within a sliding seal. A first busbar 20 and second busbar 22, comprised of similar conductive material, such as a copper alloy, are disposed within the chamber 16 and are positioned adjacent one another to define a joint 24. A focus coil (not shown) disposed in the gun 12 focuses the electron beam 14 into the joint 24 causing the heat generated by the electron beam to be localized to an area immediately surrounding the joint 24.

The process for welding together the busbars 20 and 22 will now be described. The first and second busbars 20 and 22 are secured to a conventional fixture (not shown) by conventional clamps (not shown) in the chamber 16. After the busbars are secured to the fixture, the cover (not shown) is secured onto the chamber 16 and air is withdrawn from the gun 12 and chamber 16 through the hoses 28 and 26.

respectively, to create a vacuum. For example, the vacuum may be at a level in the range of $10^{-1}$ Torr to $10^{-5}$ Torr and preferably at $5 \times 10^{-2}$. The gun 12 is then activated and energy in the form of the electron beam 14 is transmitted therefrom. The gun 12 is then moved in the direction of arrow X so that the electron beam 14 traverses the joint 24. It is to be understood that the electron beam 14 may remain stationary and the joint 24 may move under the electron beam 14. As the electron beam 14 moves over the joint 24, the busbars 20 and 22 are welded together at the joint 24 to form a weldment 30. The energy level at which the gun 12 operates and the speed at which it traverses the joint 24 are sufficient to allow the electron beam 14 to penetrate and heat the busbar material near the joint, thereby providing mixing of the busbar material to form the weldment 30. For example, it has been found that the gun 12 is best operated at an energy level of 70 mA at 60 kV while it traverses the joint 24 at a speed of 15 in/min. during this first weld pass. It should be noted that the energy level that the gun 12 operates and the speed that the gun 12 traverses the joint 24 are directly associated with one another. The energy level may be changed provided the speed is correspondingly changed. For example, if the energy level is increased, the speed must be increased and if the energy level is decreased, then the speed must be decreased.

After the above-described weld pass, a second weld pass is utilized to provide a cosmetic finish on the weldment 30. The gun 12 traverses the weldment 30 to provide this cosmetic finish which eliminates the need to grind excess weld material from the weldment 30 and busbars 20 and 22. The level at which the gun 12 operates and the speed at which it traverses the weldment 30 are sufficient to allow the electron beam 14 to heat the weldment 30 to cause the weldment material to melt and flow to a level which is flush to or less than the surface of the busbars 20 and 22 while limiting excess heat build-up in the weldment 30 so that it does not collapse. It has been found that the gun 12 is best operated at an energy level of 70 mA at 60 kV while it traverses the weldment 30 at a speed of 30 in/min. during this second weld pass.

After the above-described first and second passes, the chamber 16 is vented and the cover (not shown) is removed therefrom. The first and second busbars 20 and 22 are then turned over so that the other side of the busbars 20 and 22 may be welded together. The cover (not shown) is secured to the chamber 16 and then the air is withdrawn from the gun 12 through the hose 28 and from the chamber 16 through the hose 26 to create a vacuum. The joint 24 on the opposite side of the busbars 20 and 22 is then welded using the above-described method. After this second welding process is completed, the chamber 16 is vented and the cover 18 is removed to provide access to the busbars 20 and 22.

The above-described arrangement and method provides a joint that has less excess weld material than the gas arc welding process. Additionally, this method does not require the use of a low conductive filler wire to create the joint, thereby providing a welded joint that is just as conductive as the busbars themselves.

Figure 2:
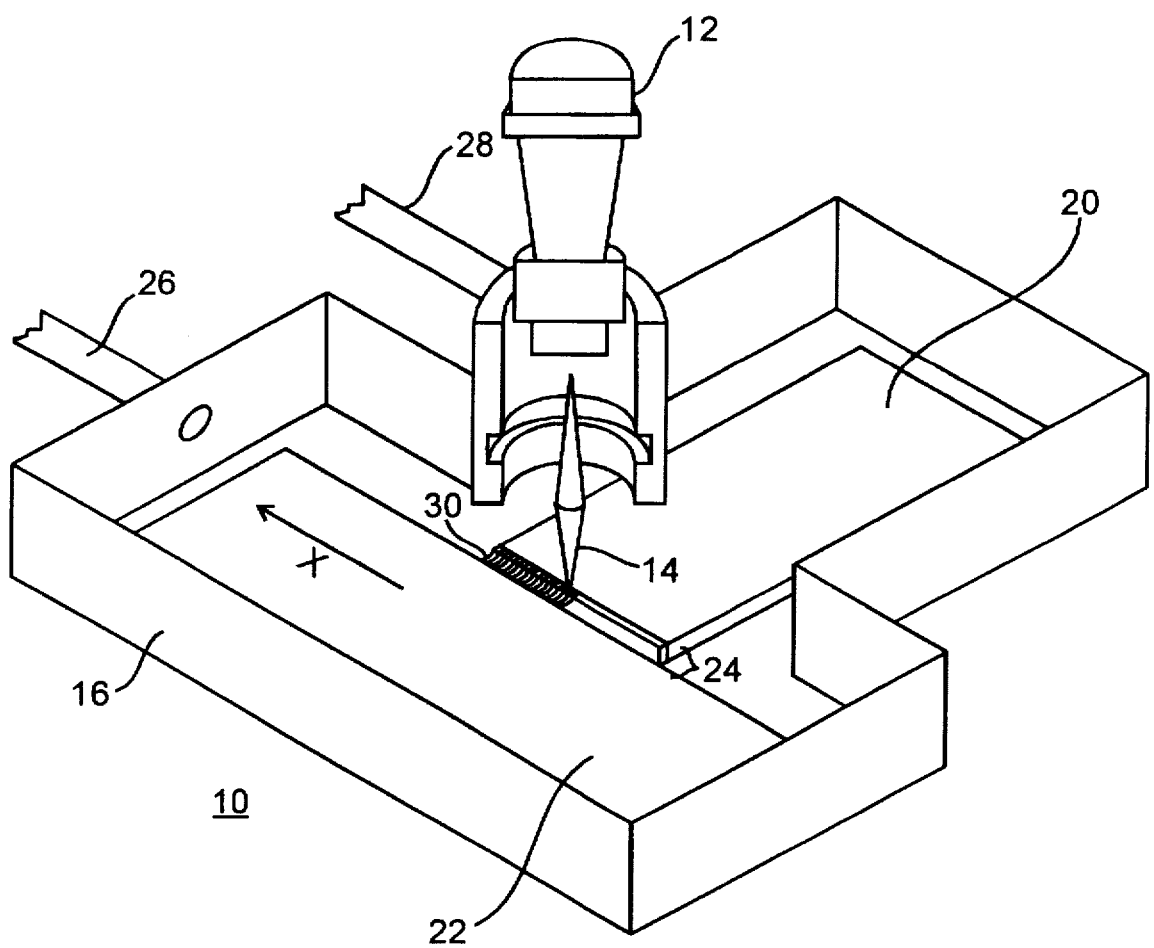
FIG. 2 is an isometric drawing of an electron beam welding arrangement for joining aluminum alloy material together according to the present invention.

According to another preferred embodiment, the busbars 20 and 22 are comprised of an aluminum alloy, preferably 6101 aluminum alloy. FIG. 2 shows a high silicon alloy, preferably 4047 aluminum alloy, shim 32 disposed in the joint 24 between the first and second busbars 20 and 22 prior to the welding procedure to prevent the weldment 30 from hot cracking. The high silicon in the shim 32 causes the weld material in the weldment 30 to be ductile during solidification thereof, thereby preventing the weldment 30 from hot cracking. The thickness of the shim 32 is large enough to prevent hot cracking in the weldment; however, it is thin enough to allow proper melting and mixing of the shim 32 and the busbars 20 and 22 during the welding process. It has been found that the desired performance of the shim 32 is achieved when its thickness is in the range of 0.005 in. to 0.100 in. and is preferably 0.030 in. thick.

The process for welding together these aluminum busbars will now be described. The first and second busbars 20 and 22 are secured to a conventional fixture (not shown) by conventional clamps (not shown) in the chamber 16. The shim 32 is placed in the joint 24 between the busbars 20 and 22. The cover (not shown) is then secured onto the chamber 16 and air is withdrawn from the gun 12 and chamber 16 through the hoses 28 and 26, respectively, to create a vacuum. For example, the vacuum may be at a level in the range of $10^{-1}$ Torr to $10^{-5}$ Torr and preferably at $5 \times 10^{-2}$. The gun 12 is then activated and energy in the form of the electron beam 14 is transmitted therefrom. The gun 12 is then moved in the direction of arrow X so that the electron beam 14 traverses the joint 24. It is to be understood that the electron beam 14 may remain stationary and the joint 24 may move under the electron beam 14. As the electron beam 14 moves over the joint 24, the busbars 20 and 22 and the shim 32 are welded together at the joint 24 to form the weldment 30. The energy level at which the gun 12 operates and the speed at which it traverses the joint 24 are sufficient to allow the electron beam 14 to penetrate and heat the shim 32 and the busbar material of the busbars 20 and 22 near the joint, thereby providing mixing of the shim and busbar material to form the weldment 30. For example, it has been found that the gun 12 is best operated at an energy level of 30 mA at 60 kV while it traverses the joint 24 at a speed of 30 in/min. during this first weld pass. It should be noted that the energy level that the gun 12 operates and the speed that the gun 12 traverses the joint 24 are directly associated with one another. The energy level may be changed provided the speed is correspondingly changed. For example, if the energy level is increased, the speed must be increased and if the energy level is decreased, then the speed must be decreased.

After the above-described weld pass, a second weld pass is utilized to provide a cosmetic finish on the weldment 30. The gun 12 traverses the weldment 30 to provide this cosmetic finish which eliminates the need to grind excess weld material from the weldment 30 and busbars 20 and 22. The level at which the gun 12 operates and the speed at which it traverses the weldment 30 are sufficient to allow the electron beam 14 to heat the weldment 30 to cause the weldment material to melt and flow to a level which is flush to or less than the surface of the busbars 20 and 22 while limiting excess heat build-up in the weldment 30 so that it does not collapse. It has been found that the gun 12 is best operated at an energy level of 30 mA at 60 kV while it traverses the weldment 30 at a speed of 30 in/min. during this second weld pass.

After the above-described first and second passes, the chamber 16 is vented and the cover (not shown) is removed therefrom. The first and second busbars 20 and 22 are then turned over so that the other side of the busbars 20 and 22 may be welded together. The cover (not shown) is secured to the chamber 16 and then the air is withdrawn from the gun 12 through the hose 28 and from the chamber 16 through the hose 26 to create a vacuum. The joint 24 on the opposite side of the busbars 20 and 22 is then welded using the above-described method. After this second welding process is completed, the chamber 16 is vented and the cover 18 is removed to provide access to the busbars 20 and 22.

The above-described arrangement and method for welding together busbars made of aluminum provides a joint that has less excess weld material than the gas arc welding process. The shim 32 is thin enough so that its effect on the conductivity of the weldment 30 is negligible. Additionally, this method does not require the use of a low conductive filler wire to weld busbars together, thereby providing a welded joint that is substantially as conductive as the busbars themselves.

From the foregoing detailed description, it can thus be seen that the present invention provides an improved arrangement and method to join similar conductive material which provides decreased process cycle time and increased conductivity in the welded joint. For example, the improved arrangement provides a welded joint that is free of excess weld material which commonly occurs during traditional metal arc welding processes. Obviously, this eliminates the need to remove the excess weld material after the welding process, thereby reducing the time and cost of the welding process. The improved arrangement also provides a welded joint that is more a joint created by a metal arc welding process, thereby producing a lower heat rise when current flows through the joint.

The foregoing description is not limited to the specific embodiment herein described, but rather by the scope of the claims which are appended hereto. For example, although the invention has been described with reference to welding the busbars in a vacuum, the process may be adapted to welding the busbars out of the vacuum.

What is claimed is:

1. A method for welding together components of electrical distribution equipment including a first busbar and a second busbar made of a metal alloy material, the method comprising the following steps:

retaining the first busbar adjacent to the second busbar inside a chamber;

securing a cover onto the chamber;

securing an electron beam gun onto the chamber;

removing air from the electron beam gun to create a vacuum therein;

operating the electron beam gun at a first predefined energy level to generate an electron beam;

traversing the electron beam gun past the first busbar and the second busbar at a first predefined speed to form a joint which is constructed substantially of a portion of the first busbar and the second busbar;

wherein the first predefined energy level and the first predefined speed are selected to be such that the electron beam penetrates, heats and mixes the busbar material at the joint to form the joint;

operating the electron beam gun at a second predetermined energy level to generate a second electron beam; and traversing the electron beam gun past the joint at a second predetermined speed;

wherein the second predetermined energy level and the second predetermined speed are selected to be such that the second electron beam heats and melts the material at the joint so that the material flows to a level not above the surface of the first and second busbars, thereby preventing the build up of excess weld material at the joint.

2. The method, as claimed in claim 1, further comprising the step of removing air from the chamber to create a vacuum therein.

3. The method, as claimed in claim 2, wherein the first busbar and the second busbar comprises an aluminum alloy.

4. The method, as claimed in claim 3, further comprising the step of inserting an aluminum filler shim between the first busbar and the second busbar.

5. The method, as claimed in claim 4, wherein the step of operating the electron beam gun further comprises the step of operating the electron beam at an energy of approximately 30 mA at 60 kV.

6. The method, as claimed in claim 5, wherein the first predefined speed is approximately 30 in./min.

7. The method, as claimed in claim 6, further comprising after the step of traversing the electron beam gun the steps of:

operating the electron beam gun at an energy level of approximately 30 mA at 60 kV; and traversing the electron beam past the joint at a speed of approximately 30 in./min.

8. The method, as claimed in claim 1, wherein the first busbar and the second busbar comprise a copper alloy.

9. The method, as claimed in claim 8, wherein the first predefined energy level is approximately 70 mA at 60 kV.

10. The method, as claimed in claim 9, wherein the first predefined speed is approximately 15 in./min.

11. The method, as claimed in claim 10, wherein the second predefined energy level is approximately 70 mA at 60 kV.

12. The method, as claimed in claim 11, wherein the second predefined speed is approximately 30 in./min.

13. A method for welding together a first busbar and a second busbar in a chamber, wherein an electron beam gun is secured to the chamber and the first and second busbars are made of aluminum material, the method comprising the following steps:

retaining the first busbar adjacent to the second busbar inside the chamber to define a joint;

inserting a filler shim into the joint, wherein the shim is made of aluminum material;

closing and sealing the chamber;

removing air from the chamber and the electron beam gun to create a vacuum;

operating the electron beam gun at a first predefined energy level to generate an electron beam;

traversing the electron beam gun past the joint at a first predefined speed such that the electron beam penetrates, heats and mixes the shim and the first and second busbar material near the joint to form a weldment having weldment material which is constructed substantially of the filler shim, a portion of the first busbar and a portion of the second busbar;

operating the electron beam gun at a second predefined energy level to generate a second electron beam; and traversing the electron beam gun past the joint at a second predefined speed;

wherein the second predetermined energy level and the second predetermined speed are selected to be such that the second electron beam heats and melts the material at the joint so that the material flows to a level not above the surface of the first and second busbars, thereby preventing the build up of excess weld material at the joint.

14. The method, as claimed in claim 13, wherein the first and second busbars comprise an 6101 aluminum alloy.

15. The method, as claimed in claim 14, wherein the filler shim comprises 4047 aluminum alloy.

16. The method, as claimed in claim 15, wherein the shim has a thickness in the range of 0.005 in. to 0.100 in.

17. The method, as claimed in claim 13, wherein the first and second predetermined energy levels are approximately 30 mA at 60 kV.

18. The method, as claimed in claim 17, wherein the first and second predetermined speeds are approximately 30 in./min.

19. The method, as claimed in claim 18, wherein the vacuum is at a level in the range of $10^{-1}$ Torr to $10^{-5}$ Torr.

* * * * *